(12) United States Patent
Archuleta, Jr. et al.

(10) Patent No.: US 10,501,689 B2
(45) Date of Patent: Dec. 10, 2019

(54) MOBILE CHARCOAL/BIOCHAR PRODUCTION AND PELLETIZER SYSTEM AND METHOD THEREOF

(71) Applicant: The United States of America as Represented by the Secretary of Agriculture, Washington, DC (US)

(72) Inventors: James Geronimo Archuleta, Jr., Pilot Rock, OR (US); Deborah Page-Dumroese, Moscow (ID)

(*) Notice: Subject to any disclaimer, the term of this patent is extended or adjusted under 35 U.S.C. 154(b) by 199 days.

(21) Appl. No.: 15/643,739

(22) Filed: Jul. 7, 2017

(65) Prior Publication Data

US 2018/0010043 A1 Jan. 11, 2018

Related U.S. Application Data

(60) Provisional application No. 62/360,134, filed on Jul. 8, 2016.

(51) Int. Cl.

| | | |
|---|---|---|
| *C09K 17/04* | (2006.01) |
| *C10B 53/02* | (2006.01) |
| *C10B 39/04* | (2006.01) |
| *C10B 49/06* | (2006.01) |
| *C10B 57/00* | (2006.01) |
| *C10B 5/00* | (2006.01) |
| *C05G 3/04* | (2006.01) |
| *C05G 3/00* | (2006.01) |
| *C05F 11/02* | (2006.01) |
| *C10L 5/36* | (2006.01) |
| *C10L 5/44* | (2006.01) |

(52) U.S. Cl.
CPC .............. *C09K 17/04* (2013.01); *C05F 11/02* (2013.01); *C05G 3/00* (2013.01); *C05G 3/0058* (2013.01); *C05G 3/04* (2013.01); *C10B 5/00* (2013.01); *C10B 39/04* (2013.01); *C10B 49/06* (2013.01); *C10B 53/02* (2013.01); *C10B 57/005* (2013.01); *C10L 5/363* (2013.01); *C10L 5/368* (2013.01); *C10L 5/447* (2013.01); *Y02E 50/14* (2013.01)

(58) Field of Classification Search
CPC ......... C09K 17/04; C10B 53/02; C10B 39/04; C10B 49/06; C10B 57/005; C10B 5/00; C05F 11/02; C05G 3/04; C05G 3/00; C05G 3/0058; C10L 5/363; C10L 5/368; C10L 5/447; Y02E 50/14
See application file for complete search history.

(56) References Cited

U.S. PATENT DOCUMENTS

2011/0114144 A1* 5/2011 Green ...................... C05D 9/00
136/201

* cited by examiner

*Primary Examiner* — Cephia D Toomer (57) ABSTRACT

Embodiments of the invention provide a portable charcoal system and method of operating thereof, wherein the portable charcoal system comprises a first compartment adapted to burn a material, a second compartment connected to the first compartment and adapted to receive the material from the first compartment, and a third compartment adapted to receive the material from the second compartment, the third compartment comprising an auger adapted to move the material from a back end to a front end, and out of the third compartment. The portable charcoal system further includes a source of air.

28 Claims, 6 Drawing Sheets

MOBILE CHARCOAL/BIOCHAR PRODUCTION AND PELLETIZER SYSTEM AND METHOD THEREOF

CROSS REFERENCE TO RELATED APPLICATIONS

This application claims priority under 35 U.S.C. § 119 to U.S. Provisional Patent Application 62/360,134 filed Jul. 8, 2016, the entire contents of which is incorporated herein by reference.

FIELD OF THE INVENTION

This invention relates to charcoal and/or biochar producing systems. Specifically, the charcoal and/or biochar production system, as disclosed herein, provides a portable device that can be used to make charcoal and biochar on-site for many forestry and mill applications.

BACKGROUND

Biomass, biomass waste, and, in particular, wood waste, has been a problem for many landfill and lumbering operations. Regardless of the terminology used to describe biomass over the years (e.g., slash, chips, YUM), there are few methods that utilize biomass waste to benefit soil productivity, sequester carbon, or reduce greenhouse gas emissions.

An Oregon State University examination showed that 10 tons/acre of biochar application may increase dryland wheat yield by 26% to 33%. Dependent upon the conversion method used to obtain this biochar, approximately 33 to 80 tons of green biomass is needed. In perspective, if that biomass is removed from the forest at a rate of 10 tons/acre, one acre of treated farmland would resultantly reduce the risk of wildfire of 3 to 8 acres of forest.

In brief, charcoal and/or biochar can be a viable source of Soil Organic Matter (SOM). The Natural Resources and Conservation Service claims that an increase of 1 percent of SOM can increase soil/water potential by about 25,000 gallons/acre. Charcoal and/or biochar, when produced appropriately, can be greater than 80 percent pure carbon, making the use of this material both a way to improve soil water available to the plants and a viable way to sequester stable carbon with the alternative objective of soil improvement. This stable form of carbon will decompose on a very long time frame. Most common forms of carbon sequestration relies on vegetation growth, which may result in temporary carbon sequestration; available to future biologic decomposition.

One reason for the lack of use of biomass waste are harvest logistics and the final value of products made from biomass. Low-value biomass is often under-utilized because of the difficulty of transportation and high transportation costs thereof due to most processing facilities being located off-site from the harvesting site. In order to overcome these difficulties, wood waste is sometimes ground to reduce its volume. However, this can be expensive, harmful to the environment, and fails to reduce the amount of wood waste. Also, in some instances, grinding, chipping, and hauling the wood waste may spread problems related to insect infestation and/or negatively contribute to climate change.

When biomass has no merchantable value, a common method of biomass disposal is open air burning of residual piles. However, these methods may reduce soil productivity for years as the heat generated from such burn piles may negatively alter the soil underneath the pile. Therefore, in order to prevent such, the wood waste may alternatively be burned in fireboxes or fire pits on-site. Further, in order to reduce ash and smoke released during the incineration process, a flow of air has been used to provide an air curtain over a fire pit or firebox in which the waste is burned. For example, U.S. Pat. Nos. 4,756,258 and 5,415,113 describe portable apparatuses that may be used in air curtain incinerations. In particular, U.S. Pat. No. 4,756,258 discloses a fan and manifold assembly that can be towed to and positioned at the edge of a fire pit and U.S. Pat. No. 5,415,113 teaches a firebox, fan, and manifold assembly mounted on a support frame for transport to a desired clearing site for the incineration of waste without the need to dig a fire pit.

Further, U.S. Pat. Nos. 6,536,360 and 7,063,027 teach air-curtain fireboxes or incinerators designed to capture waste heat for useful applications. Yet even with the aforementioned advances, biomass incineration still suffers many drawbacks.

Current curtain burners offer a way to increase the speed of biomass consumption with fire and concurrently reduce the risk of wildfires. Unfortunately, current curtain burners are designed to completely consume woody biomass, ultimately and irreversibly turning the wood waste to ash. In other words, by simply eliminating biomass from a site, current curtain burners only offer a service. As such, current air curtain burners eliminate many benefits that may result from potential charcoal and/or biochar that may be produced from the biomass. Further, current air curtain burners are batch processes, requiring an operator to insert and remove material from the air curtain burners after each operational use.

Therefore, a new portable charcoal device is desired that may effectively benefit soil productivity, sequester the carbon from the wood waste into useable matter, and reduce greenhouse gas emissions during a continuous operation.

SUMMARY OF THE INVENTION

The embodiments provided herein provide a portable charcoal device that can be deployed for in-woods or on-site charcoal or biochar manufacturing. Some specific embodiments of the invention provide a portable charcoal system comprising a first compartment, a second compartment, and a third compartment. In this embodiment, the first compartment is at least partially defined by four walls and adapted to burn a material. Further, the first compartment comprises an open top and a bottom with at least a portion thereof configured to allow burnt material to pass to the second compartment. The second compartment is at least partially defined by four walls, may be connected to the first compartment, and may be adapted to receive the material from the first compartment. Further, the third compartment is at least partially defined by a front end, a back end, and may be connected to the second compartment. In particular, the third compartment is adapted to receive the material from the second compartment and comprises an auger adapted to move the material from the back end to the front end and out of the third compartment. In this particular embodiment, the portable charcoal system further includes a source of air so that the source of air may direct a curtain of air across the open top of the first compartment.

Some embodiments of the invention further provide a portable charcoal system comprising a first compartment, a second compartment, and third compartment. The first compartment is at least partially defined by four peripheral walls and a platform on a bottom end thereof, and the second compartment is at least partially defined by four peripheral walls and the platform on a top end thereof. Further, at least a portion of the platform is configured to allow burnt material to pass to the second compartment. The third compartment may be connected to an end of the second compartment and may comprise an auger and an extruder.

In further illustrative embodiments, the bottom of the first compartment may be in the form an expanded metal, a sieve, or a grate. In alternative illustrative embodiments, at least a portion of the bottom of the first compartment is perforated. The bottom of the first compartment may also be capable of moving vertically and/or axially in relation to the four walls of the first compartment. The second compartment may also comprise a plurality of chain driven drag bars and/or directional bars on a bottom thereof. Alternatively, the second compartment may have an angled bottom surface. Further, the third compartment may also comprise an extruder and a heat conductive medium. The heat conductive medium may optionally include an additive therein.

Some embodiments of the invention provide a portable charcoal system comprising an intake compartment, a first compartment, a second compartment, and a third compartment. The intake compartment may include a four walled hopper and a fan. The first compartment may be at least partially defined by a first cylindrical wall and the second compartment may be at least partially defined by a second cylindrical wall. Illustratively, at least a portion of the second cylindrical wall is solid and partially surrounds the first cylindrical wall. Further in this embodiment, at least a portion of the first cylindrical wall is configured to allow burnt material to pass to the second compartment, e.g., a sieve or a grate. The third compartment may be connected to the second compartment and may comprise an auger adapted to move material from a back end to a front end of the third compartment. In addition, the portable charcoal system may comprise a source of air.

In this embodiment, the first cylindrical wall of the portable charcoal system may be at least one of an expanded metal, a sieve, or a grate. Alternatively, the first cylindrical wall may be perforated. The first compartment and the second compartment may be capable of rotating axially by the use of a drive wheel and/or drum trunnion. The third compartment may further comprise a heat conductive medium. In further embodiments, the heat conductive medium may include an additive.

Some embodiments of the invention further provide a method of continuously producing charcoal from a portable burn system. The method may comprise the steps of initiating a combustion process of biomass within a burn compartment, directing a stream of air from a source of air to at least one compartment of the portable burn system, burning the biomass inside the burn compartment to produce an amount of charcoal, transferring the amount of charcoal from the burn compartment to an extruding compartment through a collection compartment, and quenching and extruding the charcoal in the extruding compartment.

In further embodiments, the method may include a step of cutting the charcoal into a pellet, a step of drying the charcoal, and/or a step of packaging the charcoal. Wherein the method comprises the step of drying the charcoal, in a particular embodiment, the charcoal may be dried using the heat generated in the step of burning the biomass inside the burn compartment.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The embodiments described herein are for use in burning wood waste, e.g., pallets, forest slash, land-clearing debris, general green waste, slash, chips, YUM, storm debris, and/or other biomass waste.

Figure 1:
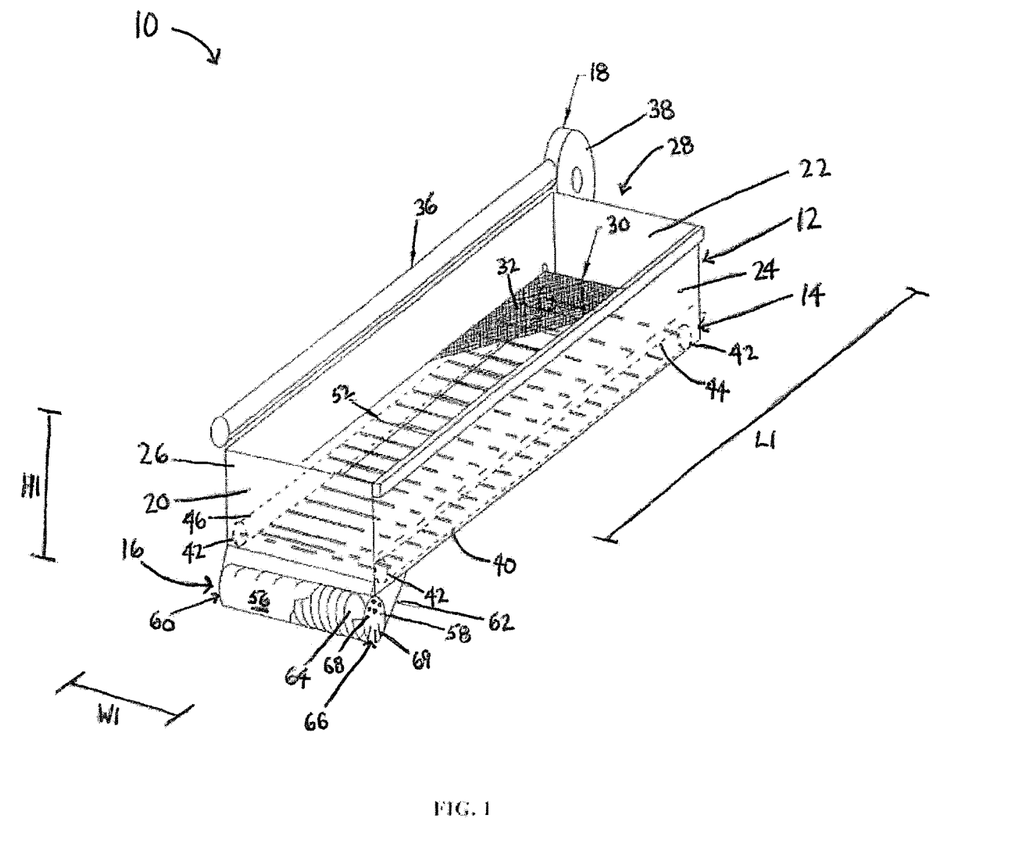
FIG. 1 is a perspective partial cross-sectional view of a portable charcoal device according to one embodiment of the invention.
Figure 2:
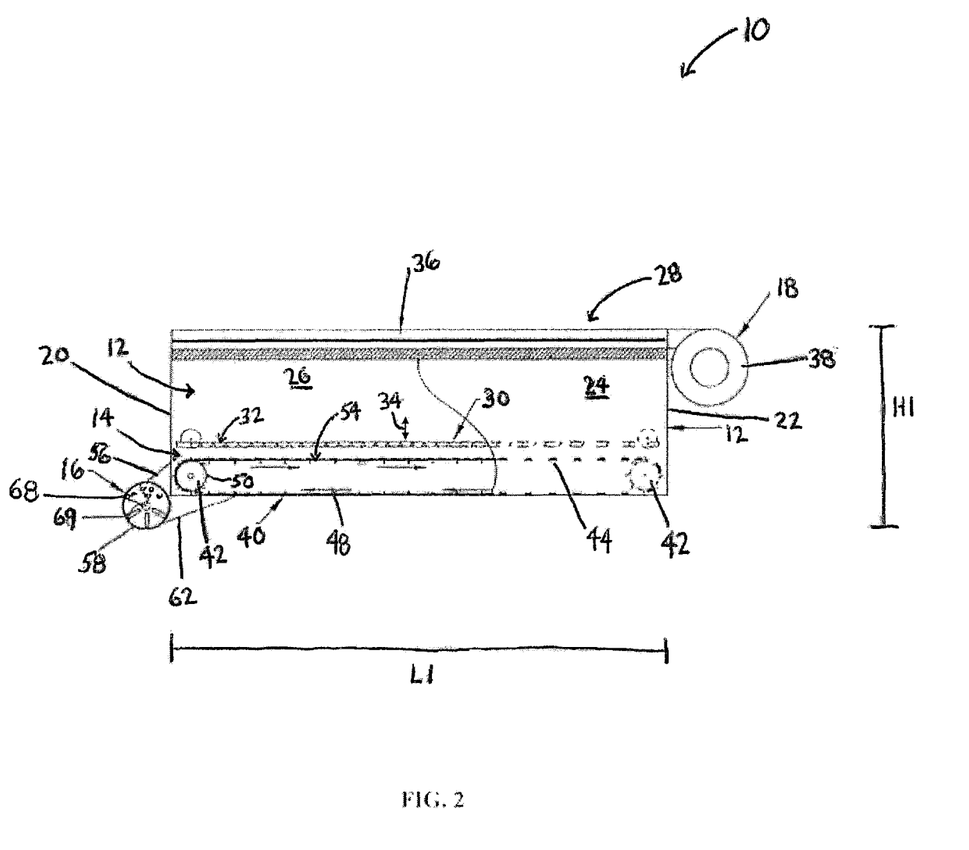
FIG. 2 is a side elevational partial cross-sectional view of the portable charcoal device of FIG. 1.

FIGS. 1 and 2 illustrate a portable charcoal device 10 according to one embodiment of the invention. The portable charcoal device 10 is capable of converting biomass into useable charcoal and/or biochar. The portable charcoal device 10 may include a first compartment or burn compartment 12, a second compartment or collection compartment 14, and a third compartment or an extruding compartment 16. Further, the portable charcoal device 10 may include a source of air 18.

In this particular embodiment, the burn compartment 12 is defined by four peripheral walls 20, 22, 24, 26, an open top 28, and a bottom surface 30. Further, the four peripheral walls 20-26 are generally perpendicular to the bottom surface 30. In alternative embodiments, the four peripheral walls may be acutely or obtusely angled in relation to the bottom surface 30. In this embodiment, the peripheral walls 20-26 may be any suitable material capable for the containment of incineration therein. In the preferred embodiment, the peripheral walls 20-26 may be 4 inch refractory panels filled with proprietary thermal ceramic material.

The bottom surface 30 may be in the form of a grate, screen, or the like. In other words, the bottom surface 30 may include apertures 32. The apertures 32 may be a plurality of shapes and sizes. The apertures 32, in particular embodiments, may range from ¼ inches to 0.0083 inches (70 mesh) in opening. In some embodiments, the apertures 32 are ⅛ inch to 1 inch openings and, in particular embodiments, are ¼ to ½ inch openings. However, it should be appreciated that the apertures 32 may be a plurality of shapes and sizes. During use, the apertures 32 may function as a sieve and, in effect, retain large material burning in the burn compartment 12, while allowing smaller coals to exfoliate and fall into the collection compartment 14. Therefore, as one skilled in the art would appreciate, the apertures 32 may be shaped and/or sized for the particular use thereof. For example, when relatively large charcoal or biochar is desired, the apertures 32 may have 1 inch or larger openings.

In a further embodiment, the bottom surface 30 may be capable of shaking. In these embodiments, the bottom surface 30 may include a shaking feature or a shaker (not shown) that may be programmed with a rate of shaking. In the preferred embodiment, the rate of shaking may be dependent upon a consumption of an amount of burning coals exfoliating on the bottom surface 30. With reference to FIG. 2, the shaking feature and/or shaker moves the bottom surface 30 vertically (as shown by arrows 34). In effect, the shaking feature helps to increase exfoliation of burning coals from the burning wood waste mass and decrease the size of large exfoliations to pass through the apertures 32. Further, the shaker helps to release burning coals into the collection compartment 14.

As shown in FIGS. 1 and 2, the portable charcoal device 10 may include the source of air 18. In this embodiment, the source of air 18 may be provided by an air curtain manifold 36 arranged to direct a curtain of air, or preferably high-velocity airflow, over the open top 28 of the burn compartment 12. The source of air 18 may further include a fan 38 driven by an engine (not shown) to generate airflow through the air curtain manifold 36. In an illustrative embodiment, the fan 38 is a custom heavy duty air fan.

As mentioned, in this embodiment, the portable charcoal device 10 may further include the second compartment or collection compartment 14. In this embodiment, the collection compartment 14 may be defined or at least partially defined by the four peripheral walls 20-26 and is located below the burn compartment 12. In this particular embodiment, the four peripheral walls 20-26 of the collection compartment 14 are the four peripheral walls 20-26 of the burn compartment 12. In alternative embodiments, the collection compartment 14 may have peripheral walls separate from the burn compartment 12. As such, the collection compartment 14 may have a different width or depth than the burn compartment 12. Further, in some embodiments, it may be desired to remove the burn compartment 12 from the collection compartment 14 during transportation purposes, due to transportation restrictions, and the like. Therefore, in alternative embodiments, the collection compartment 14 may be attached and detached from the burn compartment 12 when desired.

In this embodiment, the collection compartment 14 has a top end at least partially defined by the bottom surface 30 of the burn compartment 12. Further, the collection compartment 14 includes a chain and drag bar system 40. As shown in FIG. 2, the chain and drag bar system 40 may be a conveyor belt assembly with a plurality of pulleys 42, a first and a second chains 44, 46, and a belt positioned between the first and second chains 44, 46. In this embodiment the conveyor belt assembly moves in a direction as shown by arrows 48. The pulleys 42 include a plurality of protrusions 50 on an outer circumference thereof allowing the first and the second chains 44, 46 to be in conjunction with the pulleys 42. As a result, upon rotation of the pulleys 42, the first and second chains 44, 46 rotate to move the belt. The chain and drag bar system 40 may also include a plurality of drag bars 52 positioned on a top surface 54 of the belt. In effect, the drag bars 52 may assist in moving an amount of material that falls from the burn compartment 12 into the extruding compartment 16.

With reference to FIGS. 1 and 2, the portable charcoal device 10 may further include an extruding compartment 16. The extruding compartment 16 may be at least partially defined by an outer wall 56, a front end 58, and a back end 60. The outer wall 56 may form a floor 62. In the preferred embodiment, the floor 62 of the outer wall 56 may be angled to allow material collected thereon to fall into the extruding compartment 16 by gravity.

The extruding compartment 16 may be provided by any suitable material. In particular embodiments, the material of the extruding compartment 16 may be chosen in order to limit the amount of wear from heat and liquid on an inside surface thereof. In an illustrative embodiment, the extruding compartment 16 may be built from a stainless steel material.

The extruding compartment 16 may further include an auger 64 positioned therein. The auger 64 is adapted to move material from the back end 60 to the front end 58 of the extruding compartment 16. In some embodiments, the front end 58 of the extruding compartment 16 includes an extruder 66. In effect, as the auger 64 moves material from the back end 60 to the front end 58, the material may be extruded into charcoal pellets using the extruder 66. The extruder 66 may include a plurality of extrusion ports 68 capable of extruding the charcoal into a variety of shapes and sizes. In some embodiments, the extruder plate holes or extrusion ports 68 may be scaled to match the size of most agricultural implements which distribute pelletized or prilled material. In further embodiments, the extruding compartment 16 may also include a knife set up 69 that may assist in cutting the charcoal and/or biochar into the desired shape, thickness, length, etc.

The extruding compartment 16 may also include a heat conductive medium therein. For example, in one embodiment, the extruding compartment 16 is filled with water. As such, upon entering the extruding compartment 16 from the collection compartment 14, the charcoal and/or biochar is quenched and cooled. In specific embodiments, the heat conductive medium may be nutrient laden or include additives. For example, the additive may include a fertilizer or a pellet binder.

In particular embodiments, a fertilizer is added to the extruding compartment 16 to provide the equivalence of approximately 200 lbs/acre of Nitrogen in the heat conductive medium so that the C:N ratio may decrease. Further, putting dry material directly through a pellet mill may result in a fire. Therefore, other material may be added to the biochar material during pellet production to help hold together the pellet and help produce a more uniform pellet.

For example, fresh logging slash, i.e., finely (<¼") needles and twigs, may be mixed with the material prior to extrusion in the extruding compartment 16. The moisture and resins present in the fresh slash may assist in holding the biochar product together and may further add nutrients from the needles to the biochar product. In a preferred embodiment, true first, e.g., white firs (*Abies concolor*), may be used as a binder or additive. True firs, and more specifically white firs, have a high resin output, making them a desirable additive. However, high resin material may be diluted prior to use as additives in alternative embodiments. Further, many conifers may produce extra resin when stressed. As such, diseased and stressed conifer strands may be used as binder additives herein for palletization needs.

Further additives may include nutrient mixes of Nitrogen (N), Phosphorous (P), Potassium (K), Sulfur (S), lignin, gluten, or other commercially available liquid nutrients. These additives may be used at various and non-limiting proportions to fit custom soil conditions, dependent upon consumer needs.

When the heat conductive medium includes additives, the charcoal pellet may be considered a biologically active product with soil conditioning properties, e.g., improvements to tilth, infiltration, and water holding capacities. It is preferred that the depth of the heat conductive medium in the extruding compartment 16 does not exceed the lowest extrusion port in order to limit fluid loss therefrom.

The portable charcoal device 10 may have a height H1, a width W1, and a length L1. In some embodiments, the height H1 may range from about 4 feet to about 15 feet or may range from about 6 feet to about 10 feet. Further, in these embodiments, the width W1 may range from about 4 feet to about 15 feet or may range from about 5 feet to about 9 feet and the length L1 may range from about 10 feet to about 40 feet or may range from about 15 feet to about 25 feet.

Figure 3:
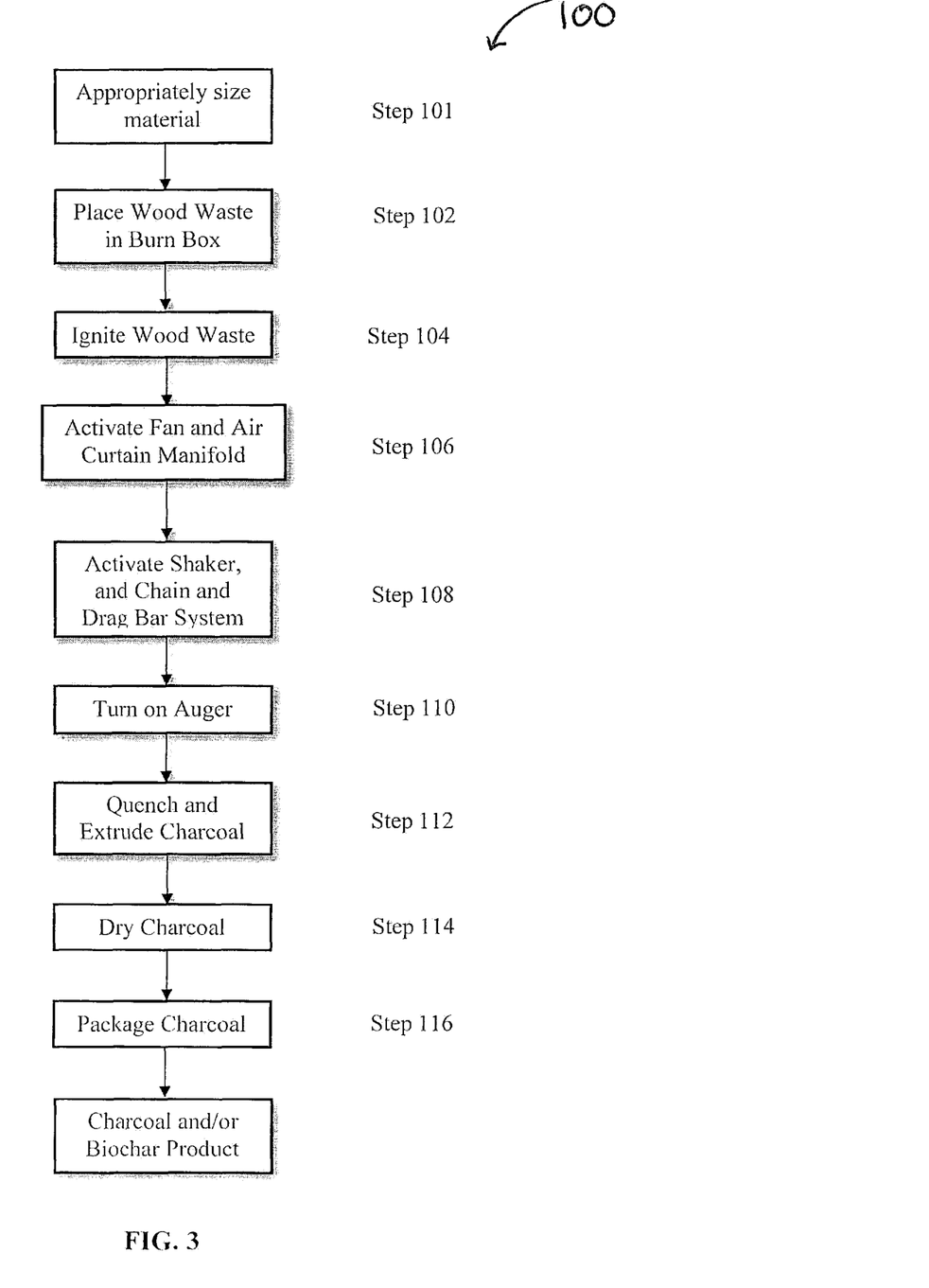
FIG. 3 depicts an illustrative process or method for the operation of the portable charcoal device of FIG. 1.

FIG. 3 depicts a method 100 for operating the portable charcoal device 10 to produce charcoal and/or biochar. First, in step 101, wood waste or other material may be appropriately sized for insertion into the portable charcoal device 10. During step 102, wood waste, debris, or the like of varying sizes may be placed in the burn compartment 12 through the open top 28. In this particular embodiment, an amount of approximately 3 to 10 tons of wood waste may be placed therein. After inserting wood waste in the burn compartment 12, the wood waste may be ignited at step 104. The wood waste may be ignited manually or automatically using a flame.

For example, the portable charcoal device 10 may include a fuel supply tank (not shown), a fuel-burning electrical power generator (not shown) in communication with the fuel supply tank, and/or a fuel-burning burner unit (not shown) in communication with the fuel supply tank for directing a flame into the burn compartment 12. Once the fire has spread sufficiently and will not be extinguished by air movement, the fan 38 and the air curtain manifold 36 may be activated in step 106 so that an effective curtain of air may be supplied across the open top 28 of the burn compartment 12.

The fan 38 and/or the air curtain manifold 36 may also be used to control an operating temperature inside the burn compartment 12. For instance, in some embodiments, the operating temperature is above 500° C. in order to minimize the accumulation of polycyclic aromatic hydrocarbon, i.e., PAH, and other carcinogens forming on produced biochar. As such, in these embodiments, the operating temperature may be monitored and the amount of air supplied to the burn compartment 12 may be dependent or altered variant upon the operating temperature therein.

During the initial fire spread, some small particles may fall through the bottom surface 30. However, the desired conversion of the wood waste to charcoal may occur after some time of burning. The conversion of the wood waste to charcoal mostly occurs from the consumption of 1 hour fuels, i.e., wood waste with fuel energy storage sufficient to burn for one hour (wood waste of approximately 0 to ¼ inch diameters). In the case of wood waste with larger diameters, charcoal may form as rinds on the exterior of 10-hour to 100-hour fuels, i.e., ¼ to 1 inch diameters and 1 to 3 inch diameters, respectively, or larger woods. The shaker and the chain and drag bar system 40 may be activated at step 108 in order to accelerate the loosening of the charcoal rinds from the larger woods via agitation of the bottom surface 30. The agitation from step 108 helps separate the exfoliating charcoal from the burning wood in the burn compartment 12 and ultimately the transfer of the charcoal to the collection compartment 14.

In some embodiments, the agitation of the bottom surface 30 may be intermittingly turned on and off in order to allow charcoal to form on the wood waste in the burn compartment 12 or to allow charcoal to be removed from the burn compartment 12. For example, in the scenario that wood does not exfoliate at an acceptable rate, the bottom surface 30 may be automatically or manually programmed to stop shaking in order to allow charcoal to form on the biomass. Once charcoal is of adequate abundance, the bottom surface 30 may continue to shake. Further, the bottom surface 30 may be programmed to turn on and off intermittingly for predetermined lengths of time. In this embodiment, the predetermined lengths of time may be dependent upon the type or size of waste wood placed within the burn compartment 12. This process also allows the charcoal to be separated from possible condensation of volatiles on the surface thereof, resulting in a cleaner charcoal product.

Once a significant amount of wood waste has been burned and converted to charcoal in the burn compartment 12, more wood or wood waste may be introduced to the burn compartment 12. The wood waste may simply be placed in the burn compartment 12 by dropping the wood waste in the open top 28 thereof and through the air curtain. This process allows the method 100 to be a continuous process, increasing the throughput of the portable charcoal device 10.

After activating the shaker and chain and drag bar system 40, the auger 64 may be activated at step 110. Following step 110, charcoal which has fallen into the collection compartment 14 from the burn compartment 12 may move into the extruding compartment 16, allowing the charcoal to be quenched (by the heat conductive medium therein), crushed, and extruded using the extruder 66 at step 112. In step 112, any embers still burning will be extinguished. In effect, in step 112, the material in the extruding compartment 16 may be mixed and moved from the back end 60 to the front end 58 of the extruding compartment 16 using the auger 64. The charcoal extrusions may exit the extruding compartment 16 through the extrusion ports 68. The extruding ports 68 may be provided with a variety of sizes. For example, in a particular embodiment, the extruding ports 68 may include an aperture size of between about 0.1 inches and about 0.25 inches. A cutter or the knife set up 69 may be synced with the auger 64 to turn simultaneously in order to form uniform pellets. The cutter 69 may be synced to produce pellets of a desired length. In one embodiment, the cutter 69 produces pellets with a length between about 0.1 inches and about 1 inch.

After extrusion, the method 100 may further comprise drying the pellets from step 112 in step 114. In particular embodiments, the portable charcoal device 10 may be adapted so that heat generated from the burn compartment 12 after step 104 may be used to dry the pellets in step 114. In alternative embodiments, the pellets may be dried through a dryer box with a conveyor in step 114. Once dried, the pellets may be packaged and sealed into sacks or containers in step 116. Alternatively, the pellets may be applied to the site at which the portable charcoal device 10 is located or to neighboring sites.

Figure 4:
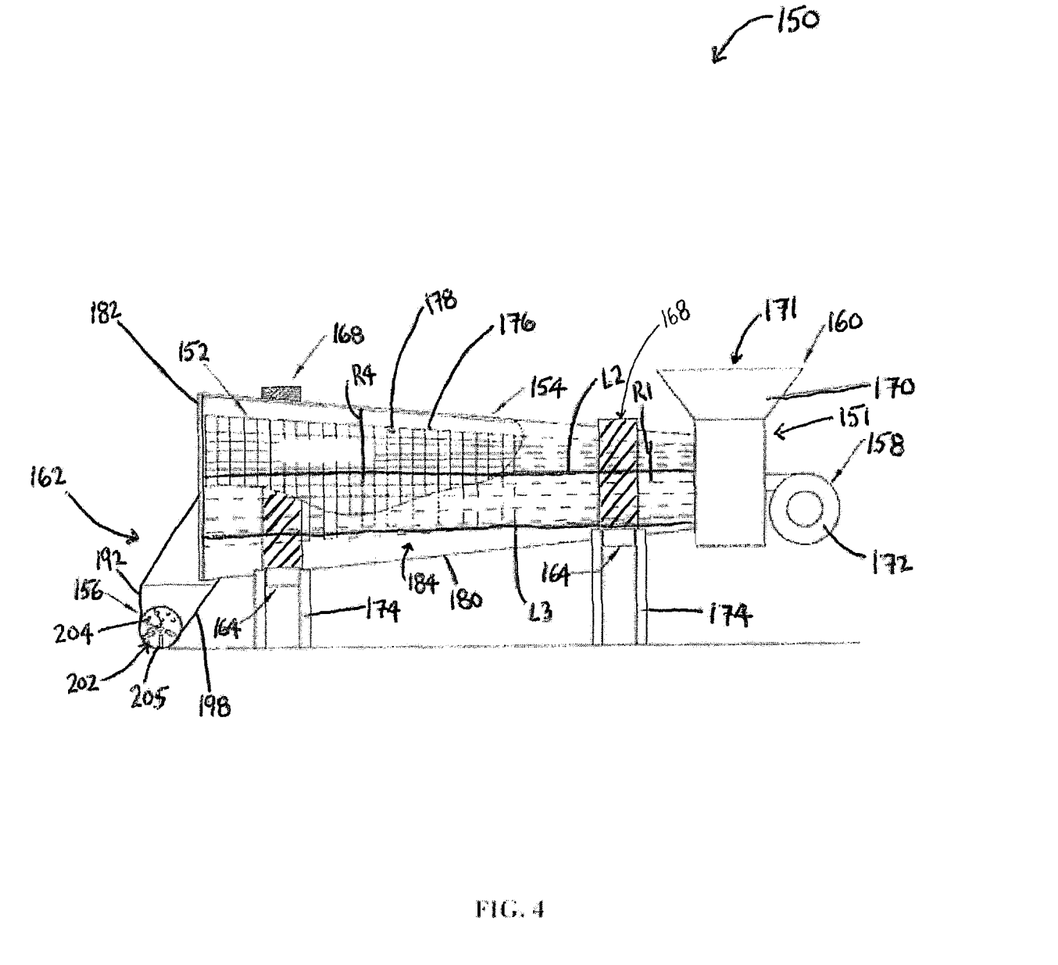
FIG. 4 is a side partial cross-sectional view of a perspective view of another portable charcoal device according to another embodiment of the invention.
Figure 5:
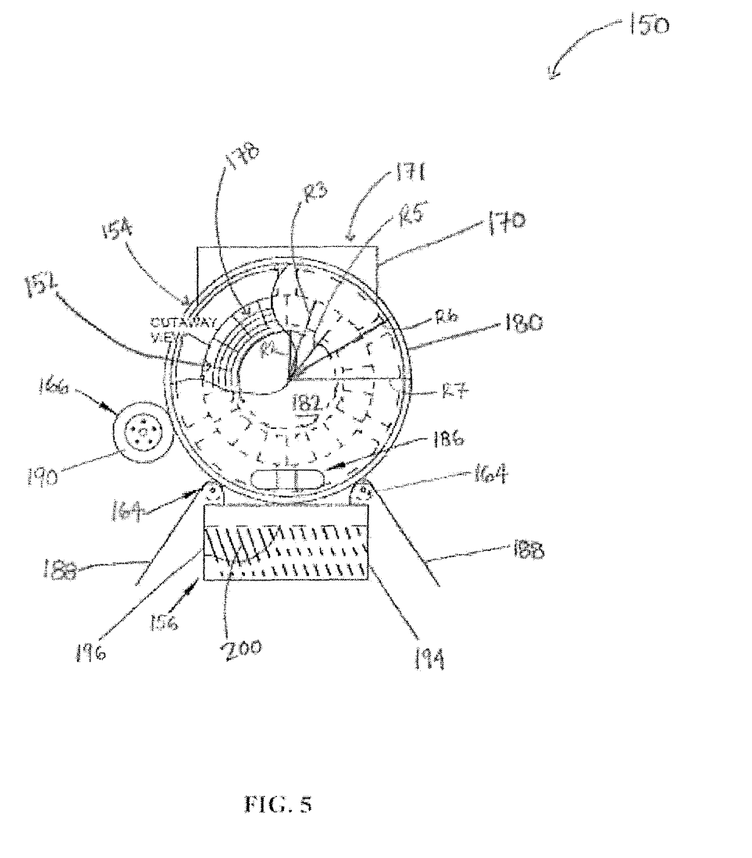
FIG. 5 is a front partial cross-sectional view of the portable charcoal device of FIG. 4.

FIGS. 4 and 5 illustrate a portable charcoal device 150 according to another embodiment of the invention. In this particular embodiment, the portable charcoal device 150 may include an intake or hopper compartment 151, a first or burn compartment 152, a second or collection compartment 154, a third or extruding compartment 156, and a source of air 158. The burn and the collection compartments 152, 154 might be blocked up or angled to operate at a slight incline, such as between five and ten degrees, for example.

Alternatively, the burn compartment 152 and the collection compartment 154 may have a conical shape with an upper end smaller in diameter than a lower end thereof. Opposite ends of the burn compartment 152 and the collection compartment 154 may be identified as a material feed end 160 and a material discharge end 162. When the burn compartment 152 and the collection compartment 154 are conical as schematically shown in FIGS. 4 and 5, the upper end thereof is the material feed end 160 into which wood waste or biomass may be inserted. The material feed end 160 may also be referred to as the upstream end. As custom, the terms "upstream" and "downstream" may also be used herein to refer to the flow of the biomass material through the burn compartment 152 and the collection compartment 154.

Further, the portable charcoal device 150 may include a plurality of rollers 164, a drive wheel 166, and a tire 168. The burn compartment 152 and the collection compartment 154 may both be supported for rotation about longitudinal axes through the compartment on the rollers 164. In effect, the plurality of rollers 164, the drive wheel 166, and the at least one tire 168 may rotate to consequently cause the burn compartment 152 and the collection compartment 154 to rotate in either a counterclockwise or clockwise direction.

In this embodiment, the portable charcoal device 150 also includes the hopper compartment 151 comprising an infeed hopper 170 and a fan or blower 172. The portable charcoal device 150 further includes a plurality of supports 174. The infeed hopper 170 may be any suitable hopper known in the art and suitable for the placement of wood waste in an open top 171 thereof. The hopper compartment 151 and, in particular, the infeed hopper 170 acts as an inlet for the material feed end 160, transferring material placed therein to the burn compartment 152. The fan 172 may be attached to the infeed hopper 170 and vertically aligned with the burn compartment 152.

During use of the portable charcoal device 150, the fan 172 may direct an amount of air into the burn compartment 152 and the collection compartment 154 to prevent any embers from escaping the portable charcoal device 150. Further, during the production of charcoal in the burn compartment 152, the fan 172 may help in controlling the temperature therein.

As previously mentioned, in some embodiments, the operating temperature of the burning compartment 152 is above 500° C. in order to minimize the accumulation of polycyclic aromatic hydrocarbon, i.e., PAH, and other carcinogens forming on produced biochar. As such, in these embodiments, the operating temperature may be monitored and the amount of air supplied to the burn compartment 152 by the fan 172 may be dependent or altered variant upon the operating temperature therein. In an illustrative embodiment, the fan 172 is a custom heavy duty air fan.

The burn compartment 152 may be at least partially defined by a first cylindrical wall 176. In this particular embodiment, the cylindrical outer wall has a length L2 and a radius R1 that may increase across the length L2 of the first cylindrical wall 176. The radius R1 may be partially defined by a first radius R2 and a final radius R3. In the preferred embodiment, the burn compartment 152 is conical in shape and, as a result, the final radius R3 is greater than the first radius R2. However, it should be appreciated that in other embodiments, the final radius R2 may be less than the first radius R3, or the final radius R3 and the first radius R2 may be equal.

The length L2 of the burn compartment 152 may range from about 23 feet to about 30 feet and preferably from about 23 feet to about 25 feet. Further, the radius R1 of the burn compartment 152 may range from about 2 feet to about 4 feet and preferably from about 3 feet to about 4 feet.

In an illustrative embodiment, the burn compartment 152 may be in the form of an expanded metal, a grate, a sieve, or the like. In alternative embodiments, the first cylindrical wall 176 of the first compartment may be at least partially perforated. In either case, the first cylindrical wall 176 includes a plurality of apertures 178. The apertures 178 may be a variety of shapes and sizes. The apertures 178, in particular embodiments, may range from ¼ inches to 0.0083 inches (or 70 mesh) in opening.

In some embodiments, the apertures 178 are ⅛ inch to 1 inch or ¼ to ½ inch openings. However, as previously noted, it should be appreciated that the openings may be a plurality of shapes and sizes. During use, the apertures 178 may function as a sieve and, in effect, may retain large material burning in the burn compartment 12, while allowing smaller coals to exfoliate and fall into the collection compartment 154. In effect, the burn compartment 12 retains the large material until they decrease in size and transfer into the collection compartment 154. Therefore, as one skilled in the art would appreciate, the apertures 178 may be shaped and/or sized for the particular use therefor. For example, when relatively large charcoal or biochar is desired, the apertures 178 may have 1 inch or larger openings. Further, in the some alternative embodiments, the first cylindrical wall 176 of the burn compartment 152 may be perforated along the outer circumference thereof.

In further embodiments, the burn compartment 152 is further fitted with an internal expanded metal cage to support biomass therein. Further, in this particular embodiment, the expanded metal will be supported by lifters to support the cage and direct the flow of exfoliated coals toward the collection compartment 154.

In a further embodiment, the burn compartment 152 may be capable of rolling. In these embodiments, the burn compartment 152 may rotate to accelerate exfoliation of charcoal and further may be programmed to agitate and/or roll the burn compartment 152 at a predetermined speed. In the preferred embodiment, the rate or speed of the rotation may be dependent upon an amount of burning coals exfoliating from the burn compartment 152. In effect, the agitation and/or rolling of the burn compartment 152 may help to increase exfoliation of burning coals from the burning wood waste mass. As will be discussed in further detail herein, the burn compartment 152 and the collection compartment 154 may be capable of rolling synchronically with one another.

The collection compartment 154 may be at least partially defined by a second cylindrical wall 180 and an end wall 182 on the material discharge end 162. In this particular embodiment, the second cylindrical wall 180 has a length L3 and a radius R4 that increases across the length L3 of the second cylindrical wall 180. The radius R4 may be partially defined by a first radius R5 and a final radius R6. In the preferred embodiment, the collection compartment 154 is conical in shape and, therefore, the final radius R6 is greater than the first radius R5.

In this embodiment the second cylindrical wall 180 may be steel and, in particular, stainless steel. The steel may be provided as 0.1 to ¼ inch steel. In the preferred embodiment, the second cylindrical wall 180 may be a 4 inch refractory panel filled with proprietary thermal ceramic material.

The length L3 of the collection compartment 154 may range from about 23 feet to about 30 feet and preferably from about 23 feet to about 25 feet. Further, the radius R4 of the collection compartment 154 may range from about 3 feet to about 5 feet and preferably from about 4 feet to about 5 feet. The radius R4 of the collection compartment 154 is larger than the radius R1 of the burn compartment 152. As such, the collection compartment 154 at least partially surrounds the burn compartment 152. Further, the difference between the radius R4 of the collection compartment 154 and the radius R1 of the burn compartment 152 may create a spacing 184. The spacing 184 may range from about 0 inches to greater than 12 inches.

The collection compartment 154 may further include an end wall 182 located on the material discharge end 162. The end wall 182 may act as a partition, defining an interior of the collection compartment 154 and, during use, may prevent embers from escaping the burn compartment 152 and the collection compartment 154. In this embodiment, the end wall 182 may generally be circular and complementary in shape with the material discharge end 162 of the second cylindrical wall 180. As such, the end wall 182 may have a radius substantially equal to the final radius R6. However, in another embodiment, the end wall 182 has a radius R7 slightly larger than the final radius R6. As shown in FIG. 4, the radius R7 may generally be equal to the final radius R6 plus two times the thickness of the second cylindrical wall 180. Therefore, the end wall 182 may form a shroud over the second cylindrical wall 180 or the collection compartment 154. As discussed, the end wall 182 may help to prevent embers from escaping the burn compartment 152 and the collection compartment 154.

The end wall 182 may include an outlet 186 positioned on a lower end thereof that allows accumulated material within the collection compartment 154 to move to the extruding compartment 156. In this particular embodiment, the outlet 186 may be an aperture. Further, in this particular embodiment, the end wall 182 is not affixed or, in other words, is separate from the collection compartment 154. Therefore, when the collection compartment 154 rotates, as will be described in further detail herein, the relative position of the end wall 180 stays fixed and, as follows, the outlet 186 stays positioned on a lower end of the end wall 182.

As shown in FIGS. 4 and 5, the collection compartment 154 may be supported by the plurality of supports 174. The plurality of supports 174 may be in the form of metal beams or any suitable material capable of supporting the portable charcoal device 150. The supports 174 may include the plurality of rollers 164 on a top end thereof. The rollers 164 may include a plurality of belts 188 thereon. As such, the rollers 164 may enable the collection compartment 154 to rotate thereupon during operation thereof.

As mentioned, the portable charcoal device 150 may further include a drive wheel 166. The drive wheel 166 may include a wheel 190 and a motor (not shown) configured to transmit force by converting torque into a tractive force in order to rotate the collection compartment 154 of the portable charcoal device 150. In this particular embodiment, the burn compartment 152 and the collection compartment 154 are affixed together. As a result, upon rotation of the collection compartment 154, the burn compartment 152 also rotates. Rotation of the burn compartment 152 and/or the collection compartment 154 may allow burnt material to mechanically break in size and may direct the burnt material from the collection compartment 154 to the outlet 186 and, resultantly, to the extruding compartment 156. As will be discussed in more detail below, the combination of the rotation of the collection compartment 154 and the relative incline thereof acts to move charcoal therein to the outlet 186.

In this embodiment, the collection compartment 154 may further include a third compartment or extruding compartment 156. The extruding compartment 156 is located downstream from the burn compartment 152 and the collection compartment 154 and positioned to receive material exiting the collection compartment 154 through the outlet 186. In the case the burn compartment 152 and the collection compartment 154 are elevated (as shown in FIGS. 4 and 5), the extruding compartment 156 is positioned below the collection compartment 154. The extruding compartment 156 may be at least partially defined by an outer wall 192, a front end 194, and a back end 196. The outer wall 192 may generally have an angled surface 198 to allow material collected therein to fall into an auger 200.

The extruding compartment 156 may be provided by any suitable material. In particular embodiments, the material of the extruding compartment 156 may be chosen in order to limit the amount of wear from heat and liquid on an inside surface thereof. In an illustrative embodiment, the extruding compartment 156 may be built from a stainless steel material.

The auger 200 is adapted to move material from the back end 196 to the front end 194 of the extruding compartment 156. In some embodiments, the front end 194 of the extruding compartment 156 includes an extruder 202. In effect, as the auger 200 moves material from the back end 196 to the front end 194, the material may be extruded into charcoal pellets using the extruder 202. The extruder 202 may include a plurality of extrusion ports 204 capable of extruding the charcoal into a variety of shapes and sizes. In some embodiments, the extruder plate holes or extrusion ports 204 may be scaled to match the size of most agricultural implements which distribute pelletized or prilled material. In further embodiments, the extruding compartment 156 may also include a knife set up 205 that may assist in cutting the charcoal and/or biochar into the desired shape, thickness, length, etc.

The extruding compartment 156 may also include a heat conductive medium therein. For example, in one embodiment, the extruding compartment 156 is filled with water. As such, upon entering the extruding compartment 156 from the collection compartment 154, the charcoal and/or biochar is quenched and cooled. In specific embodiments, the heat conductive medium may be nutrient laden or include additives. For example, the additive may include a fertilizer or a pellet binder. In particular embodiments, a fertilizer is added to the extruding compartment 156 to provide the equivalence of approximately 200 lbs/acre of Nitrogen in the heat conductive medium so that the C:N ratio may decrease. Alternatively, fresh logging slash, i.e., finely (<¼") needles and twigs, may be mixed with the material prior to extrusion in the extruding compartment 16. The moisture and resins present in the fresh slash may assist in holding the biochar product together and may further add nutrients from the needles to the biochar product. In further embodiments, the additive may also be nutrient mixes of Nitrogen, Phosphorous, Potassium, or the like. The additives may be used at varying proportions to make custom soil conditions, dependent upon a consumer needs.

When the heat conductive medium includes additives, the charcoal pellet may be considered a biologically active product with soil conditioning properties, e.g., improvements to tilth, infiltration, and water holding capacities. It is preferred that the depth of the heat conductive medium in the extruding compartment 156 does not exceed the lowest extrusion port in order to limit fluid loss therefrom.

Figure 6:
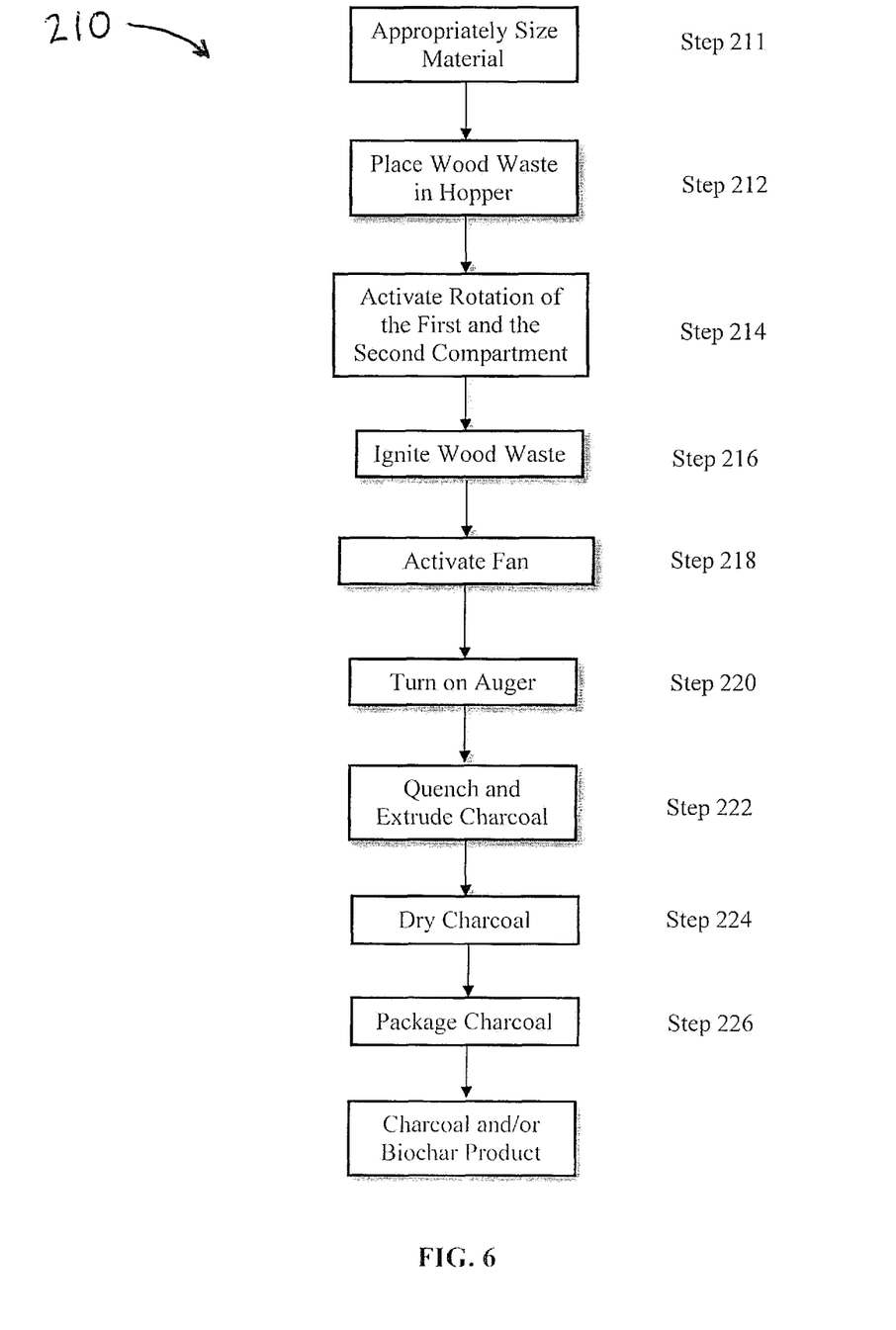
FIG. 6 depicts an illustrative process or method for the operation of the portable charcoal device of FIG. 4.

FIG. 6 depicts a method 210 for operating the portable charcoal device 150 to produce charcoal and/or biochar. Before inserting material into the portable charcoal device 150, wood waste or other material may be appropriately sized, cut, or the like in step 211. In step 212, wood waste, debris, or the like of varying sizes may be placed in the infeed hopper 170 through the open top 171 thereof. In this particular embodiment, an amount of approximately 3 to 10 tons of wood waste may be placed therein. During step 212, the drive wheel 166 may be activated at step 214 in order to allow the first compartment 152 to fill with the wood waste, debris, or the like. Once the first compartment 152 is filled with wood waste, the drive wheel 166 may be disengaged to allow ignition in step 216. The wood waste may be ignited manually or automatically using a flame. For example, the portable charcoal device 150 may include a fuel supply tank (not shown), a fuel-burning electrical power generator (not shown) in communication with the fuel supply tank, and/or a fuel-burning burner unit (not shown) in communication with the fuel supply tank for directing a flame into the burn compartment 152.

Once the fire has spread sufficiently and will not be extinguished by air movement, the fan 172 and drive wheel 166 may be activated in step 218 so that an effective amount of air may be supplied to the burn compartment 152. The fan 172 may also be used to control an operating temperature inside the burn compartment 152. For example, in some embodiments, the operating temperature is above 500° C. in order to minimize the accumulation of polycyclic aromatic hydrocarbon, i.e., PAH, and other carcinogens forming on produced biochar. As such, in these embodiments, the operating temperature may be monitored and the amount of air supplied to the burn compartment 152 in step 218 may be dependent or altered variant upon the operating temperature therein.

During or prior to the initial fire spread, some small particles may fall through the apertures 178 of the burn compartment 152. However, as discussed similarly in regard to method 100, the conversion of the wood waste to charcoal occurs after some time of burning. The conversion of the wood waste to charcoal mostly occurs from the consumption of 1 hour fuels, i.e., wood waste with fuel energy storage sufficient to burn for one hour (wood waste with diameters of approximately 0 to ¼ inches). In the case of wood waste with larger diameters, charcoal may form rinds on the exterior of 10-hour to 100-hour fuels, i.e., ¼ to 1 inch diameters and 1 to 3 inch diameters, respectively, or larger woods.

After steps 216 and 218, the shaker and/or the drive wheel 166 may be controlled in order to accelerate or decelerate the loosening of the charcoal rinds from the larger woods via agitation or rotation of the burn compartment 152. The agitation and rotation may help separate the exfoliating charcoal from the burning wood in the burn compartment 152 and transfer the charcoal to the collection compartment 154.

In some embodiments, the agitation and/or rotation of the burn compartment 152 and collection compartment 154 may be intermittingly turned on and off in order to allow charcoal to form in the burn compartment 152. For example, in the scenario that wood does not continue to exfoliate, the burn compartment 152 and the collection compartment 154 may automatically or manually programmed to stop rotating and/or shaking in order to allow charcoal to form.

Once charcoal is of adequate abundance, the burn compartment 152 and the collection compartment 154 may continue to shake or rotate. The burn compartment 152 and the collection compartment 154 may also be programmed to turn on and off intermittingly for predetermined lengths of time. In this embodiment, the predetermined lengths of time may be dependent upon the characteristics (e.g., size, moisture content, wood type, etc.) of the waste wood placed within the infeed hopper 170. The process also allows the charcoal to be separated from possible condensation of volatiles on the surface thereof, resulting in a cleaner charcoal product.

Once a significant amount of wood waste has been burned and converted to charcoal in the burn compartment 152, more wood or wood waste may be introduced to the infeed hopper 170. The wood waste may be simply placed in the infeed hopper 170 by dropping the wood waste in the open top 171 thereof. This process allows the method 210 to be a continuous process, increasing the throughput of the portable charcoal device 150.

After activating the shaker or rotation of the burn compartment 152 and the collection compartment 154, the auger 200 may be activated at step 220. Following step 220, charcoal which has fallen into the collection compartment 154 from the burn compartment 152 may move into the extruding compartment 156, allowing the charcoal to be quenched by the heat conductive medium therein and extruded using the extruder 202 at step 222. In step 222, any embers still burning will be extinguished. In effect, and during step 222, the material in the extruding compartment 156 may be mixed and moved from the back end 196 to the front end 194 of the extruding compartment 156 using the auger 200. The charcoal extrusions may exit the extruding compartment 156 through the extrusion ports 204. The knife set up 205 may be synced with the auger 200 to turn simultaneously in order to form uniform pellets.

After extrusion, the method 210 may further comprise drying the pellets from step 222 in step 224. Further, in particular embodiments, the portable charcoal device 150 may be adapted so that heat from the burn compartment 152 and the collection compartment 154 may be used to dry the pellets in step 224. In alternative embodiments, the pellets may be dried using a dryer box with a conveyor in step 224. Once dried, the pellets may be packaged and sealed into sacks or containers in step 226. Alternatively, the pellets may be applied to the site that the portable charcoal device 150 is located or to neighboring sites.

It should be understood that the portable charcoal devices 10, 150 described herein may be designed as mobile or portable devices. In other words, the portable charcoal devices 10, 150 are designed so that they may be transferred to and from a forestry site. As such, the portable charcoal devices 10, 150 may further include fittings (not shown) for cable-hoist trucks. In one particular embodiment, the fittings are in accordance with the American National Standards Institute (i.e., ANSI) specification Z245.60 for portable applications.

As a result of the mobility of the portable charcoal devices 10, 150, along with their ability to provide a continuous operation of producing charcoal or biochar, the portable charcoal devices 10, 150 may at least double production times over current air curtain burners. Further, due to the continuous operation thereof, the portable charcoal devices 10, 150 will eliminate unwanted debris in a shorter time frame than that of current air curtain burners. The continuous operation of the portable charcoal devices 10, 150 may also decrease operational costs. Additionally, the portable charcoal devices 10, 150 help convert current disposal methods of wood waste into a product production method.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A portable charcoal system comprising:
    a first compartment at least partially defined by four walls and adapted to burn a material to produce charcoal, the first compartment comprising:
        an open top; and
        a bottom;
    a second compartment at least partially defined by four walls and connected to the first compartment, the second compartment adapted to receive the charcoal from the first compartment;
    a third compartment at least partially defined by a front end, and a back end, and connected to the second compartment, the third compartment adapted to receive the charcoal from the second compartment, the third compartment comprising a front end and a back end, and an auger adapted to move the charcoal from the back end to the front end and out of the third compartment; and
    a source of air,
    wherein the source of air directs a curtain air across the open top of the first compartment; and
    wherein at least a portion of the bottom of the first compartment is configured to allow the charcoal to pass to the second compartment.

2. The portable charcoal system of claim 1, wherein the bottom of the first compartment is at least one of an expanded metal, a sieve, or a grate.

3. The portable charcoal system of claim 1, wherein at least a portion of the bottom of the first compartment is perforated.

4. The portable charcoal system of claim 1, wherein the second compartment comprises at least one of a plurality of chain driven drag bars and directional bars on a bottom thereof.

5. The portable charcoal system of claim 1, wherein the second compartment comprises an angled bottom surface.

6. The portable charcoal system of claim 1, wherein the third compartment further comprises an extruder.

7. The portable charcoal system of claim 1, wherein the third compartment further comprises a heat conductive medium therein.

8. The portable charcoal system of claim 1, wherein the bottom is capable of moving axially in relation to the four walls of the first compartment.

9. A portable charcoal system comprising:
    a first compartment at least partially defined by four peripheral walls and a platform on a bottom end thereof;
    a second compartment at least partially defined by four peripheral walls and the platform on a top end thereof; and
    a third compartment connected to an end of the second compartment, wherein the third compartment comprises:
        an auger; and
        an extruder,
    wherein at least a portion of the platform is configured to allow charcoal to pass to the second compartment.

10. The portable charcoal system of claim 9, wherein the third compartment further comprises a heat conductive medium.

11. The portable charcoal system of claim 10, wherein the heat conductive medium is water.

12. The portable charcoal system of claim 10, wherein the heat conductive medium comprises an additive.

13. The portable charcoal system of claim 12, wherein the additive is selected from the group consisting of a fertilizer and a binder.

14. The portable charcoal system of claim 9, wherein the platform is capable of moving axially.

15. The portable charcoal system of claim 9, wherein the second compartment comprises a plurality of chain driven drag bars and/or directional bars on a bottom thereof.

16. The portable charcoal system of claim 9, wherein the second compartment comprises an angled bottom surface.

17. A portable charcoal system comprising:
    a first compartment at least partially defined by a first cylindrical wall;
    a second compartment at least partially defined by a second cylindrical wall and at least partially surrounding the first compartment;
    a third compartment connected to the second compartment, the third compartment comprising a front end, a back end, and an auger adapted to move charcoal material from the back end to the front end thereof; and
    a source of air,
    wherein at least a portion of the first cylindrical wall is configured to allow charcoal to pass to the second compartment.

18. The portable charcoal system of claim 17, wherein the portable charcoal system further comprises an intake compartment.

19. The portable charcoal system of claim 18, wherein the intake compartment comprises a hopper and a fan.

20. The portable charcoal system of claim 17, wherein the first cylindrical wall is at least one of an expanded metal, a sieve, or a grate.

21. The portable charcoal system of claim 17, wherein an entirety of the cylindrical wall of the first compartment is perforated.

22. The portable charcoal system of claim 17, wherein the first compartment and the second compartment are capable of rotating axially.

23. The portable charcoal system of claim 17, wherein the third compartment further comprises a heat conductive medium.

24. The portable charcoal system of claim 23, wherein the heat conductive medium comprises an additive.

25. The portable charcoal system of claim 24, wherein the additive is selected from the group consisting of a fertilizer and a binder.

26. The portable charcoal system of claim 23, wherein the heat conductive medium is water.

27. The portable charcoal system of claim 18, the portable charcoal system further comprising a drive wheel, wherein the drive wheel is capable of rotating the first and the second compartment axially.

28. The portable charcoal system of claim 17, wherein the portable charcoal system further comprises a drum trunnion.

\* \* \* \* \*